Jan. 30, 1951  H. F. BOORN  2,539,690
METHOD OF PROVIDING PLASTIC SHEETS WITH INLAID STRIPES
Filed Jan. 7, 1947
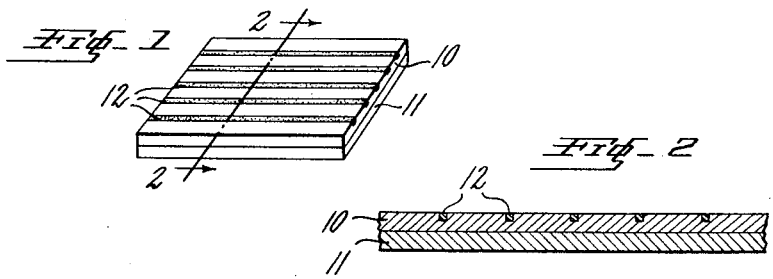
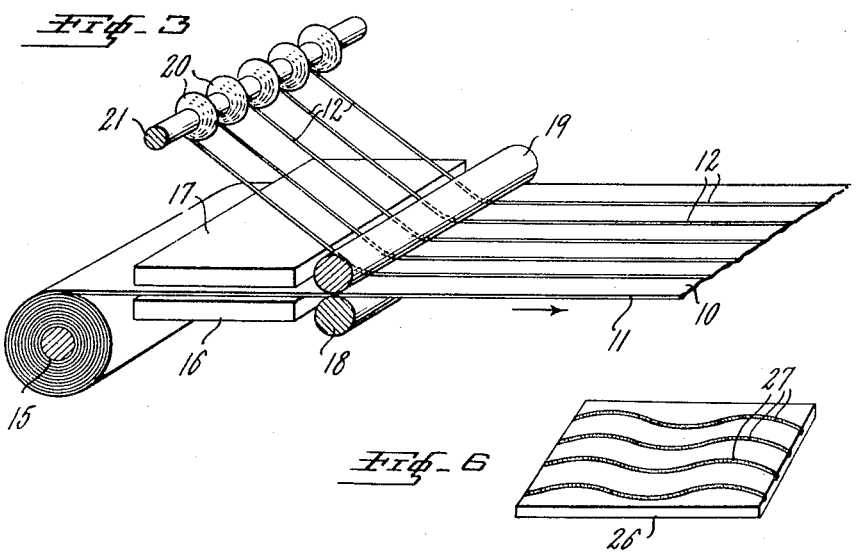
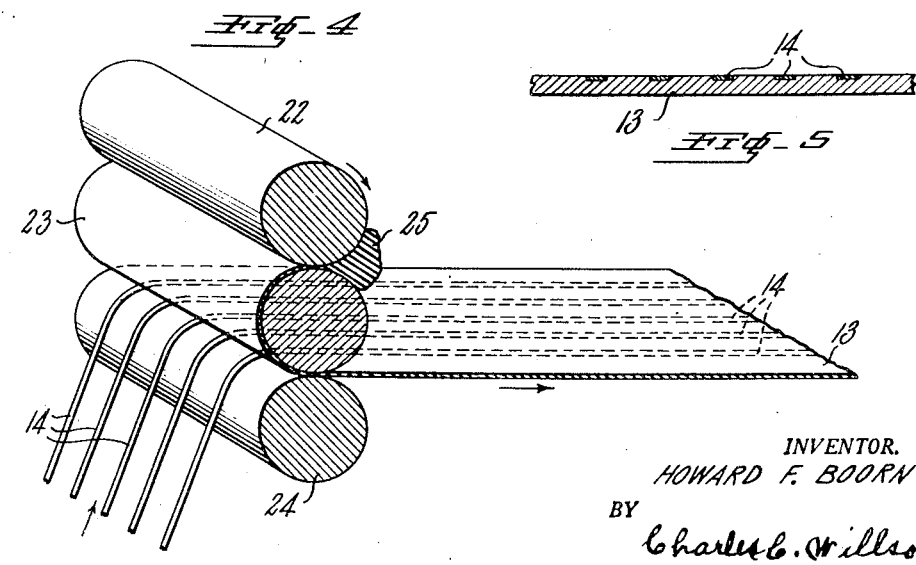
INVENTOR.
HOWARD F. BOORN
BY
Charles E. Willson
ATTORNEY Patented Jan. 30, 1951

2,539,690

UNITED STATES PATENT OFFICE 2,539,690

METHOD OF PROVIDING PLASTIC SHEETS WITH INLAID STRIPES

Howard F. Boorn, Tenafly, N. J., assignor to United States Rubber Company, New York, N. Y., a corporation of New Jersey Application January 7, 1947, Serial No. 720,594

3 Claims. (Cl. 154—90)

This invention relates to a method of providing sheets of plastic material with inlaid stripes to thereby ornament the sheet.

In the manufacture of coated fabrics and sheets of plastic material for use for various purposes it may be desirable to provide such coated or plastic material with ornamental stripes, and to impart to such stripes substantial thickness so that they will give long wear.

It is relatively easy to paint, stamp or print ornamental stripes on the surface of a coated fabric or a plastic sheet, but stripes so formed are likely to wear off readily. To overcome this difficulty the present invention contemplates a method of ornamenting the surface of such materials by forcing into such surface preformed plastic threads or ribbons to thereby embed them in the surface of the plastic material and form the desired inlaid striped design.

In carrying out the present invention it is preferable that the threads or ribbons which are to form the ornamental stripes be made of plastic material that will bond firmly to the plastic material of the sheet to be ornamented. In accordance with the present invention the threads or ribbons are forced into the surface of the plastic sheet to form the desired inlaid striped design, and it is therefore essential in carrying out the method of the present invention that the plastic sheet be placed in a much softer and more plastic condition than the threads or ribbons at the time they are united, so that these strands may be forced into the plastic sheets until the exposed faces of such strands lie approximately flush with the surface of the plastic sheet. In most cases it will be desirable to employ threads or ribbons that have a different color from that of the sheet they are to ornament so that in the finished product the inlaid stripes will present a different color from that of the ground surface of the plastic sheet. The inlaid stripes may be straight or wavy, or may have other non-straight configurations as desired.

The above and other features of the present invention and method of producing the inlaid striped sheets herein contemplated will be further understood from the following description when read in connection with the accompanying drawing wherein:

Fig. 1 is a perspective view of a coated fabric having the plastic upper surface thereof ornamented with inlaid stripes as herein contemplated;

Fig. 2 is a sectional view taken on the line 2—2 of Fig. 1;

Fig. 3 is a perspective view illustrating one form of apparatus that may be employed to carry out the method of the present invention;

Fig. 4 is a perspective view showing a different type of apparatus for carrying out the present method;

Fig. 5 is a transverse sectional view of the ornamented sheet shown in Fig. 4; and Fig. 6 is a perspective view of a plastic sheet provided with wavy inlaid stripes.

The method contemplated by the present invention may be employed to ornament plastic sheets whether or not they are provided with a reinforcing backing. In the embodiment shown in Figs. 1, 2 and 3 of the drawing the method of the present invention is employed to ornament a backed plastic sheet wherein the plastic sheet 10 is provided with a backing 11 such as felt, paper or fabric, and the upper face of this plastic sheet 10 is ornamented with the spaced inlaid stripes 12 which are shown as threads that are substantially square in cross section. In the embodiment of the invention illustrated in Figs. 4 and 5 an unbacked plastic sheet 13 is shown which sheet is ornamented with inlaid stripes in the form of spaced plastic ribbons 14. The threads 12 and ribbons 14, as will be apparent from the drawing, have flat opposite faces and are much thinner than the plastic sheet in which they are embedded.

In accordance with the disclosure of Fig. 3 the backed plastic sheet is unwound from a supply roll 15 and as it leaves such roll it passes between the spaced heated plates 16 and 17 which may be heated electrically or otherwise as desired. The purpose of these heated plates is to render the material 10 relatively soft before it reaches the nip of the cooperating pressure rolls 18 and 19 which are driven by means not shown. The threads 12 which are to be embedded in the surface of the plastic sheet 10 may be supplied to the advancing sheet 10 from the thread coils or packages 20 carried by the rotating shaft 21. The rotation of the pressure rolls 18 and 19 at the desired speed serves to advance the backed fabric from the roll 15 and the threads 12 from the supporting roll 21, and to subject them to the pressure of the nip of these rolls so that as they pass between such rolls the threads 12, which are in a much harder condition at this time than the hot plastic sheet 10, will be forced by the pressure of such rolls deep into the surface of the plastic sheet. This will cause the upper surface of such threads to lie substantially flush with the upper surface of the plastic sheet 10 as best shown in Fig. 2. The sheet with the threads embedded therein, upon leaving the pressure rolls 18 and 19 is allowed to cool or is otherwise treated to effect the desired bond between this plastic sheet and the threads 12.

Another form of apparatus that may be employed to carry out the method of the present invention is shown in Fig. 4 and comprises the calendar rolls 22, 23 and 24. A bank 25 of the plastic sheet-forming material is shown as lying at the entrance to the upper and intermediate rolls so that as such material 25 passes between these rolls it will form a sheet that passes downwardly around the intermediate roll and between its lower surface and the lower roll 24 to form the plastic sheet 13, which in this case is not backed. This sheet 13 is ornamented in accordance with the disclosure of Fig. 4 by supplying to the nip of the rolls 23 and 24 below the plastic sheet 13 the plastic ribbons 14, so that as the sheet 13 and ribbons 14 pass between the rolls 23 and 24 these ribbons will be embedded in the lower face of the sheet 13 as shown in the drawing.

As above stated the inlaid stripes may be straight or non-straight and in Fig. 6 a plastic sheet 26 is shown as provided with the inlaid wavy stripes 27. This construction may be produced by imparting a wavy motion to the threads 27 as they are advanced to apparatus such as shown in Figs. 3 or 4.

The plastic sheets 10 and 13 and also the plastic strips 12 and 14 may be formed of various types of rubber, either natural or synthetic, or various types of resinous material and when a resinous material is used it may be made transparent, partly transparent or opaque as desired, and the sheets and stripes may be given any desired contrasting colors. When the plastic sheet and stripes are formed of natural or synthetic rubber, the threads or ribbons which are to form the stripes should be vulcanized before they are embedded in the sheet to give them the desired hardness and firmness, and the sheet at this time should be unvulcanized and in a sufficient doughy or plastic condition to permit such threads or ribbons to be forced deep into the surface of the sheet. After the operation of forcing the stripes into the sheet to form the desired inlaid design is completed the sheet of unvulcanized rubber should be vulcanized. The apparatus shown in Fig. 4 lends itself well to the application of the method of the present invention to the ornamentation of a rubber sheet, in which case the bank 25 will be formed of compounded but unvulcanized rubber, and the threads 14 will be vulcanized rubber threads. The apparatus shown in Fig. 3 is better adapted for application of the present invention to a thermoplastic sheet of resinous material, such for example as Vinylite—copolymers of vinyl chloride or vinyl acetate—or Saran-copolymers of vinylidene chloride or vinyl chloride. In case the plastic sheet 10 is formed of a thermoplastic material such as just described the heat supplied by the plates 16 and 17 may suffice to render the sheet sufficiently plastic to permit the much harder threads 12 to be pressed deeply into the surface thereof as above described.

While two types of apparatus that may be employed for carrying out the method of the present invention have been illustrated in the drawing, it will be understood that other types of apparatus may be employed in carrying out the present method as defined by the annexed claims, to thereby provide a sheet of plastic material having ornamental inlaid stripes.

Having thus described my invention what I claim and desire to protect by Letters Patent is:

1. The method of forming a plastic sheet having an inlaid striped design at its wear face, which includes the steps of providing an integral sheet of plastic material and thinner strips of plastic material having flat opposite faces, providing the plastic sheet with a sheet of backing material, advancing the backed plastic sheet in the direction of its length and advancing said strips longitudinally in spaced relation to each other to a position where the strips meet the sheet and heating the backed sheet to soften its integral plastic sheet, forcing the strips into the wear face of the plastic sheet so that they are embedded therein throughout their length and to a major degree and form flat faced ornamental stripes.

2. The method of forming a plastic sheet having an inlaid striped design at its wear face, which includes the steps of providing an integral sheet of plastic material and thinner flat faced strips of plastic material that is a different color from that of the plastic sheet, providing the plastic sheet with a sheet of backing material, advancing the backed plastic sheet in the direction of its length and advancing said strips longitudinally in spaced relation to each other to a position where the strips meet the sheet and heating the backed sheet to soften its integral plastic sheet, forcing the strips into the wear face of the plastic sheet so that they are embedded therein throughout their length and to a major degree and form ornamental stripes.

3. The method of forming a sheet having an inlaid striped design at its wear face, which includes the steps of providing an integral sheet of thermoplastic resinous material and thinner flat faced strips of thermoplastic resinous material, providing said sheet with a sheet of backing material, advancing the backed sheet in the direction of its length and advancing said strips longitudinally in spaced relation to each other to a position where the strips meet the sheet and heating the backed sheet to soften its integral thermoplastic sheet, forcing the strips into the wear face of the thermoplastic sheet so that they are embedded therein throughout their length and to a major degree and form ornamental stripes.

HOWARD F. BOORN.

REFERENCES CITED

The following references are of record in the file of this patent:

UNITED STATES PATENTS

| Number | Name | Date |
|---|---|---|
| 1,304,694 | Marquette | May 27, 1919 |
| 1,565,008 | Howard | Dec. 8, 1925 |
| 1,742,777 | Midgley | Jan. 7, 1930 |
| 1,872,316 | Meeker | Aug. 16, 1932 |
| 2,041,356 | Kraft | May 19, 1936 |
| 2,166,819 | Miller | July 18, 1939 |
| 2,294,480 | Rohweder et al. | Sept. 1, 1942 |
| 2,390,712 | Hudgins | Dec. 11, 1945 |

FOREIGN PATENTS

| Number | Country | Date |
|---|---|---|
| 338,510 | Italy | Mar. 31, 1936 |